(12) United States Patent
Boys et al.

(10) Patent No.: US 6,188,179 B1
(45) Date of Patent: Feb. 13, 2001

(54) INDUCTION CIRCUITS FOR LIGHTING

(75) Inventors: John Talbot Boys, Birkdale; Andrew William Green, Papatoetoe, both of (NZ)

(73) Assignee: Auckland Uniservices Limited, Auckland (NZ)

( * ) Notice: Under 35 U.S.C. 154(b), the term of this patent shall be extended for 0 days.

(21) Appl. No.: 09/051,225
(22) PCT Filed: Oct. 4, 1996
(86) PCT No.: PCT/NZ96/00111
 § 371 Date: Apr. 3, 1998
 § 102(e) Date: Apr. 3, 1998
(87) PCT Pub. No.: WO97/16054
 PCT Pub. Date: May 1, 1997

(30) Foreign Application Priority Data

Oct. 24, 1995 (NZ) ........................................ 280319

(51) Int. Cl.[7] .................................................. H05B 37/00
(52) U.S. Cl. .......................... 315/244; 315/242; 315/243; 363/24
(58) Field of Search ................................ 315/223, 224, 315/241 R, 242, 243, 244; 363/24

(56) References Cited

U.S. PATENT DOCUMENTS 3,628,086 * 12/1971 Nuckolls .............................. 315/100
5,450,305 * 9/1995 Boys et al. ............................. 363/24

\* cited by examiner

Primary Examiner—David Vu
(74) Attorney, Agent, or Firm—Fulbright & Jaworski L.L.P.

(57) ABSTRACT

Disclosed is inductive coupling of power to devices having negative resistances, such as gas-filled discharge lamps (fluorescent tubes, neon signs, and the like) from a primary inductive loop, using resonant conditioning of the power provided to the device. A "C" shaped inductor (202) around the loop and a resonating capacitor (406) in parallel with the inductor provide a current source to the lamp (403) from across the capacitor. The circuit is capable of first igniting a lamp using a higher voltage available when the Q of the unloaded circuit is high, then running the lamp or other device at a controlled current. The lamp current is substantially proportional to the primary inductive loop flux, and substantially independent of the lamp resistance. A second inductor (404) in series with the first though not itself a collector of flux acts as a current limit. Applications include lighting, displays (optionally isolated and dimmable), and production of ultraviolet radiation.

6 Claims, 3 Drawing Sheets

INDUCTION CIRCUITS FOR LIGHTING

TECHNICAL FIELD OF THE INVENTION

Figure 1:
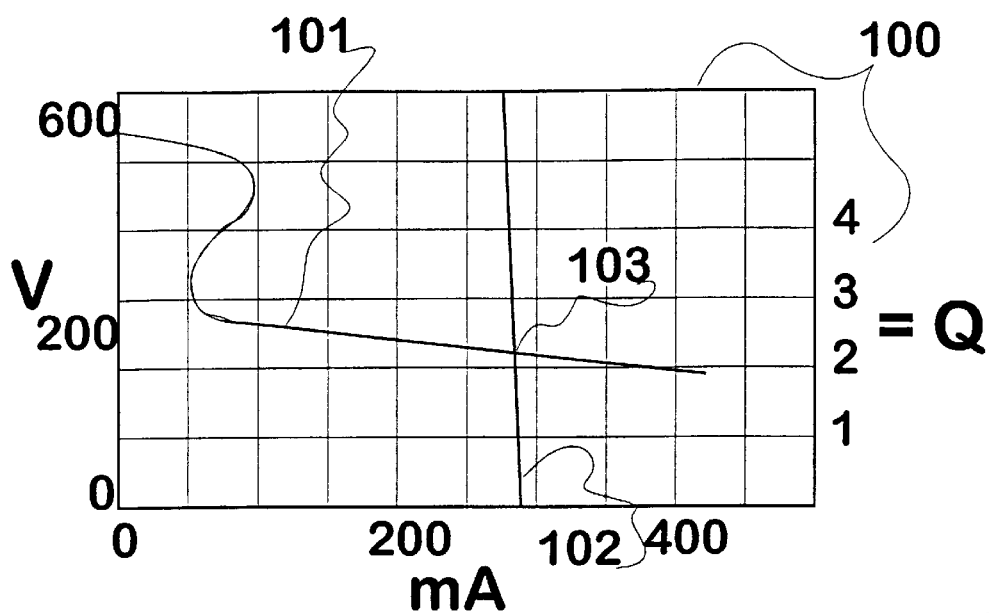

This invention relates to the field of inductive power transfer to negative-resistance devices such as gas-discharge and filament lamps, (including means to start the discharge) and in particular the invention relates to a resonant secondary circuit adapted to pick up power from an alternating magnetic field and provide power in a form matched to the requirements of a gas discharge lamp.

BACKGROUND

An example gas discharge lamp is the type commonly referred to as a fluorescent lamp. This is generally a mercury vapour plus inert or rare gas (argon or a mixture of similar gases) at low pressure, sealed into an elongated glass tube that is provided with electrodes at each end. As the name suggests, visible light is emitted from fluorescing phosphors coating the inside of the glass tube when excited by ultraviolet light. A fluorescent lamp is normally driven from the AC mains (110 V, 60 Hz or 240 V, 50 Hz etc) and must be used in series with a ballast (to limit current; the lamp having a negative "resistance" when in its running mode) and must be used with starting gear, to heat the electrodes during startup and to provide a high-voltage starting pulse. (The term "resistance" here applies to a voltage, temperature, and history-dependent property (are ions present?) which is rather an impure resistance). This ancillary circuitry results in a high capital cost for a fluorescent lamp installation and the starter device is at least as likely to fail during use as is the lamp itself.

Furthermore, it is difficult to provide brightness control of a fluorescent lamp. Yet an easily dimmable lamp would be useful in controlled illumination arrangements, in "intelligent buildings" and in lecture theatres, for example.

Another example gas discharge lamp is widely known as the neon tube as used in a neon sign. These devices comprise long and usually specially bent glass tubes terminated with electrodes and containing various rare gas fillings (including but not limited to the gas neon) at low pressure, optionally made of coloured glass and sometimes also with coating phosphors hence providing a wide variety of colours.

Typically each lamp is driven at mains frequency (50/60 Hz) by a potentially lethal 15 kV, 30 mA current limiting transformer. This voltage is used to ionise the gas filling and start the lamps. Once started, these lamps run at a lower voltage and, being gas-filled, also exhibit a negative resistance.

Furthermore, brightness control of a neon sign is very difficult to achieve. AC power control at the primary of the transformer is the usual method, resulting in on/off control only.

An isolated lamp power supply has likely safety benefits. Applications for the operation of gas discharge lamps under adverse (wet) conditions include lighting for environments where salty water exists—such as on board ship, in wharves, fish processing plants, meat processing plants, farm dairies, hotel kitchens, in coal or other mines, and the like.

Another "wet" application is in illumination of spaces or in illuminated signs used outdoors, where contact by the public with a wet sign, perhaps in a case which has deteriorated, is likely to result in lethal shock. Condensation in a window of a restaurant for example is likely whenever the weather outside is cold, or humid.

A further "wet" application is a swimming pool.

A yet further "wet" application is in the sterilisation of liquids—actually using biocidal wavelengths and substantial doses of ultraviolet light in order to sterilise liquids that may contain micro-organisms harmful to life. The working conditions under which lamps of this type are used would benefit from the use of simple, reliable, isolated lamp power supplies.

Yet another application is in testing products for resistance to ultraviolet degradation where existing accelerated test methods prescribe a certain type, positioning, and number of lamps but at present cannot prescribe that they emit a controlled amount of light.

OBJECT

It is an object of the present invention to provide an improved means for the transfer and conditioning of electricity obtained from across a space in order to energise a device having a negative resistance, such as a gas-discharge lamp, or a means which will at least provide the public with a useful choice.

These and other objects of the invention will be apparent to the ordinary artisan upon consideration of the specification as a whole.

STATEMENT OF THE INVENTION

In a first broad aspect the invention provides a circuit for collecting inductively transferred electric power and supplying the power to a load having a negative resistance, the circuit comprising:

(a) at least one first, pickup inductor having a core oriented so that it is capable of intercepting the magnetic flux radiating from a powered primary conductor in a loosely coupled fashion, thereby causing a voltage to be induced in the windings of the at least one first inductor, (b) at least one second, current-limiting inductor in series with the at least one first inductor, the second inductor having a core substantially incapable of intercepting the magnetic flux radiating from the primary conductor, (c) at least one capacitor connected across the series of inductors, thereby forming in combination with the series of inductors a circuit capable of resonance at or about a supply frequency, (d) an output from across the at least one capacitor, so that in use the circuit provides (a) when not under load, an alternating output at a high voltage—and then (b) when under load, a supply of alternating current of the constant-current type, supplying a current substantially proportional to the magnetic flux about the primary conductor yet substantially independent of the resistance of the load, and having an upper current level limited by the second inductor.

In a related aspect the current limiting inductor and the pickup inductor may be amalgamated.

In a further related aspect the invention provides a circuit as described above, wherein the load having a negative resistance is a gas discharge lamp, the lamp having a relatively high striking voltage, and a negative resistance within the arc, when struck; the circuit providing a high-voltage alternating output adapted for striking the arc when the current drawn from it is substantially zero and the circuit consequentially exhibits a high Q, and a constant-current alternating output when the current drawn is high and the Q of the circuit is low.

In a yet further related aspect the invention provides a circuit further including a saturated inductor capable of detuning the resonant circuit if the circulating voltage rises above a predetermined limit, so that an open circuit in the load has a minimal effect on a system of more than one circuit as claimed driven from one primary conductor.

In a second broad aspect the invention comprises means for converting or conditioning inductively transferred electric power to the requirements of a gas-discharge lamp, including means to provide a first striking voltage to the lamp and then to provide a second running voltage; the running voltage being supplied at substantially a constant current, the means including a circuit capable of resonance substantially at a supply frequency.

In a related aspect the invention comprises a circuit as above, wherein the circuit capable of resonance includes at least one inductive means which comprises at least a first inductive unit adapted to receive an alternating magnetic flux; the flux having the effect of inducing a voltage within the windings of the first inductive unit, and at least a second inductive unit in series, the second inductive unit having an effect of providing a limit on the current output.

In a further related aspect the invention comprises a circuit as above, further including a saturated inductor capable of detuning the resonant circuit if the circulating voltage rises above a predetermined limit.

In a second broad aspect the invention provides a system for energizing one or more lamps; the system providing a high-frequency current at a predetermined frequency within an elongated primary conductor, and at least one lamp powering means each comprising inductive power pickup means and power conditioning means.

Preferably the predetermined frequency lies between 400 Hz and 1 MHz.

More preferably the frequency is about 25 kHz.

Preferably the lamps are of the gas-discharge type. Here the lamp power unit provides high-frequency AC current initially at high voltage in order to ignite the lamp, and then at a lower voltage to drive the conductive lamp.

In a subsidiary aspect the brightness of the light emitted by the or each lamp is proportional to the current in the elongated primary conductor, over a working range.

More preferably the lamps are of the "fluorescent" type, containing at least mercury vapour.

In another aspect the invention provides a lamp powering means including power pickup means, comprising an inductor capable of receiving a magnetic flux from an elongated primary conductor, and a capacitor capable of resonating at substantially the predetermined frequency; wherein the loading of the circuit by a conducting lamp has the effect of lowering the Q of the circuit from at least 5 in a non-loaded state down to about 2, so lowering the voltage produced by the lamp powering means in proportion.

Preferably the lamp powering means also includes means to modify or control the current provided by the lamp powering means, the modifing means comprising a further inductance having a substantially smaller ability to receive an external magnetic flux.

Preferably the lamp powering means also includes means to retain control over an unloaded situation resulting in high voltages, the control means preferably comprising saturable inductor means across the capacitor; the saturable inductor means being capable of saturation under abnormal conditions whereupon the resonant frequency of the circuit is altered.

Figure 4:
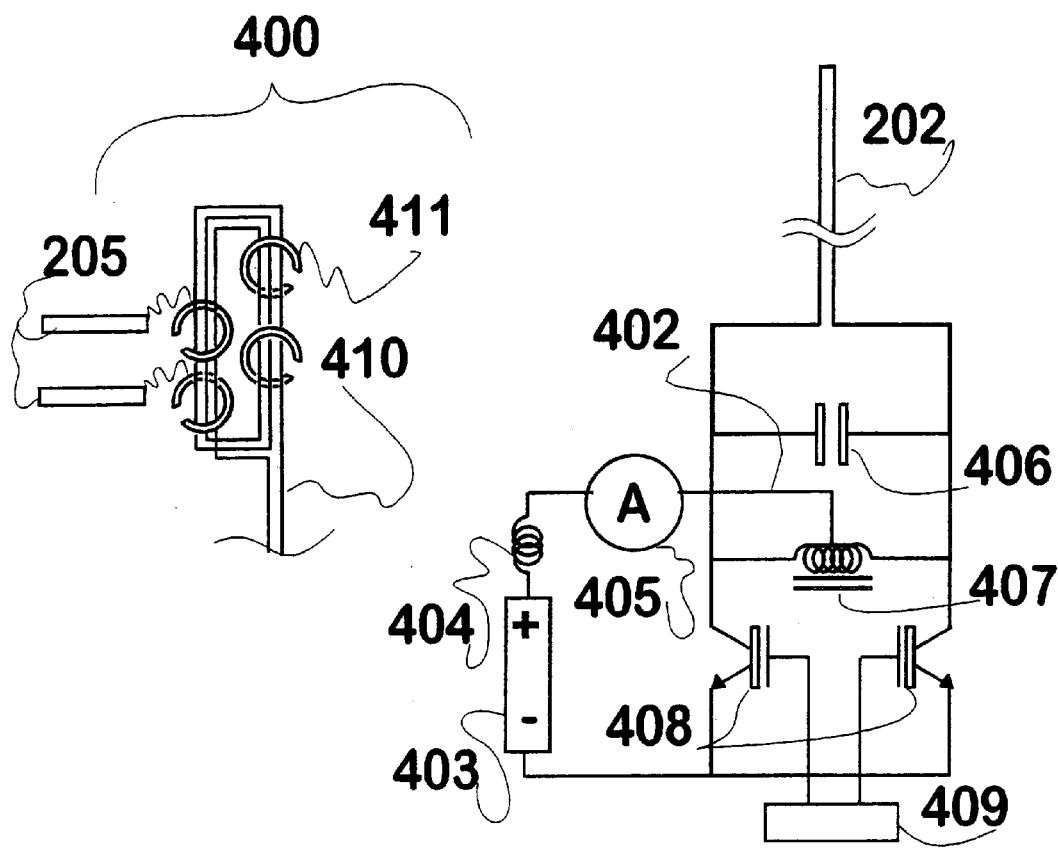

In an alternative aspect the invention comprises load monitoring means for monitoring the load drawn from the elongated primary inductor, preferred means comprising an ammeter used with a resonant power supply of the type shown in FIG. 4; the ammeter indicating the current drawn by the power supply.

In a further alternative embodiment the invention comprises water sterilisation means, comprising one or more lamps capable of producing ultra-violet light of a type and intensity having an effective activity against unwanted forms of life, at least some lamps being powered by up to one lamp powering means as described previously, and each lamp powering means being powered by inductive pickup from an elongated primary conductor carrying a high-frequency current.

In one aspect the invention provides a system for energising one or more lamps; the system providing a high-frequency current at a predetermined frequency within an elongated primary conductor, and at least one lamp powering means each comprising inductive power pickup means and power conditioning means.

Preferably the predetermined frequency lies between 400 Hz and 1 MHz.

More preferably the frequency is about 25 KHz.

Preferably the lamps are of the gas-discharge type. Here the lamp power unit provides high-frequency AC current initially at high voltage in order to ignite the lamp, and then at a lower voltage to drive the conductive lamp.

In a subsidiary aspect the brightness of the light emitted by the or each lamp is proportional to the current in the elongated primary conductor, over a working range.

More preferably the lamps are of the "fluorescent" type, filled with mercury vapour.

Optionally the lamps may be intended to radiate ultraviolet light and in that case, means for converting the ultraviolet rays by fluorescence into visible light and blocking residual rays with a glass envelope (quartz is used instead) are not included.

In another aspect the invention provides a lamp powering means including power pickup means, comprising an inductor capable of receiving a magnetic flux from an elongated primary conductor, and a capacitor capable of resonating at the predetermined frequency; wherein the loading of the circuit by a conducting lamp has the effect of lowering the Q of the circuit from at least 5 in a non-loaded state down to about 2, so lowering the voltage produced by the lamp powering means in proportion.

Preferably the lamp powering means also includes means to modify or control the current provided by the lamp powering means, the modifying means comprising a further inductance having a substantially smaller ability to receive a magnetic flux.

Preferably the lamp powering means also includes means to retain control over an unloaded situation resulting in high voltages, the control means comprising saturable inductor means across the capacitor; the saturable inductor means being capable of saturation under abnormal conditions.

In an alternative aspect the invention comprises load monitoring means for monitoring the load drawn from the elongated primary inductor, the means comprising an ammeter within a resonant power supply of the type shown in FIG. 4.

In a further alternative embodiment the invention comprises water sterilisation means, comprising one or more lamps capable of producing ultra-violet light of a type and intensity having an effective activity against unwanted forms of life, each lamp being powered by up to one lamp powering means as described previously, and each lamp powering means being powered by inductive pickup from an elongated primary conductor carrying a high-frequency current.

Preferably the water sterilisation means includes means to monitor and control the amount of light given off by the lamp or lamps. In a further alternative environment In a further alternative embodiment the invention provides means suitable for generating light underwater wherein each lamp powering means is encapsulated within a waterproof casing and has no bare connectors.

In a yet further alternative embodiment the invention comprises an advertising or information sign comprised of one or more neon tubes, wherein the invention includes means to adjust the brightness of the at least one neon tube from time to time, by altering the current in the elongated inductor, in order to attract attention.

In a yet further alternative embodiment the invention comprises an advertising or information sign comprised of one or more "neon" tubes, wherein the invention includes means to adjust the brightness of the at least one neon tube from time to time, by altering the current in the elongated inductor, so having a visual effect capable of attracting attention.

In a still further application the invention comprises one or more incandescent (metal filament) lamps energised by inductive power transfer to lamp powering means. (Here, means to strike an arc are irrelevant).

DRAWINGS

The following is a description of a preferred form of the invention, given by way of example only, with reference to the accompanying diagrams.

FIG. 1: is a graph showing the voltage-current relationship of a gas discharge lamp, the output characteristics of a circuit of the invention, and the Q of the circuit when producing a given voltage.

Figure 2:
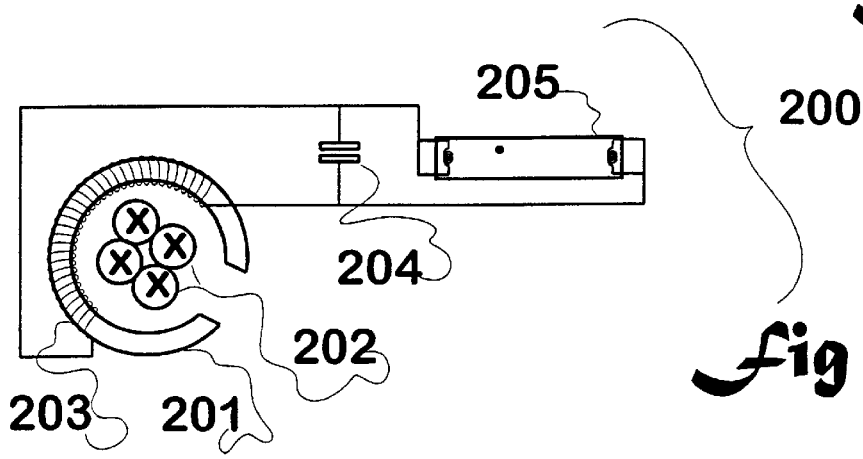

FIG. 2: is an illustration of a basic circuit of the present invention.

Figure 3:
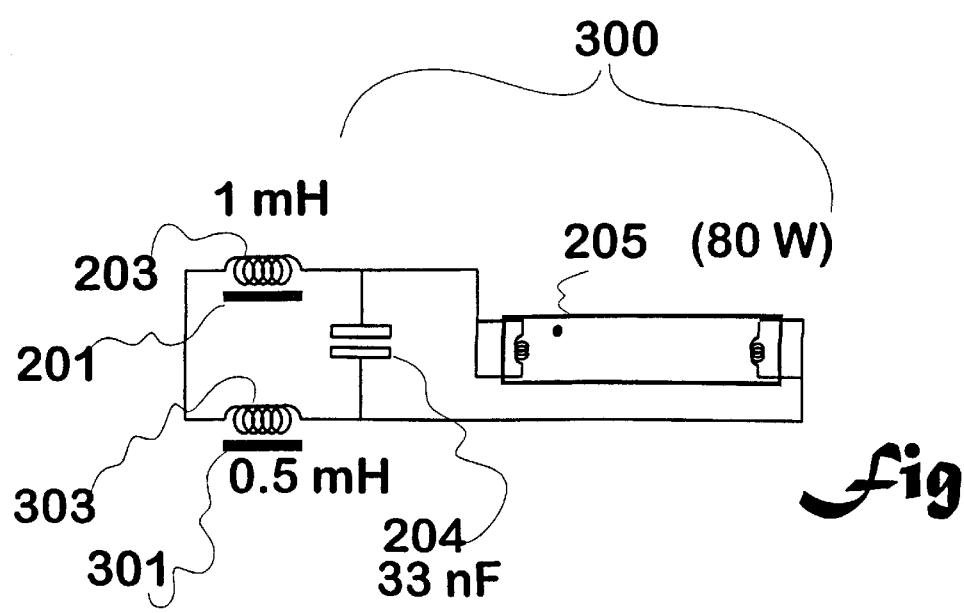

FIG. 3: is an illustration of a current-limited circuit of the present invention.

FIG. 4: is a circuit of a working system of the present invention.

Figure 5:
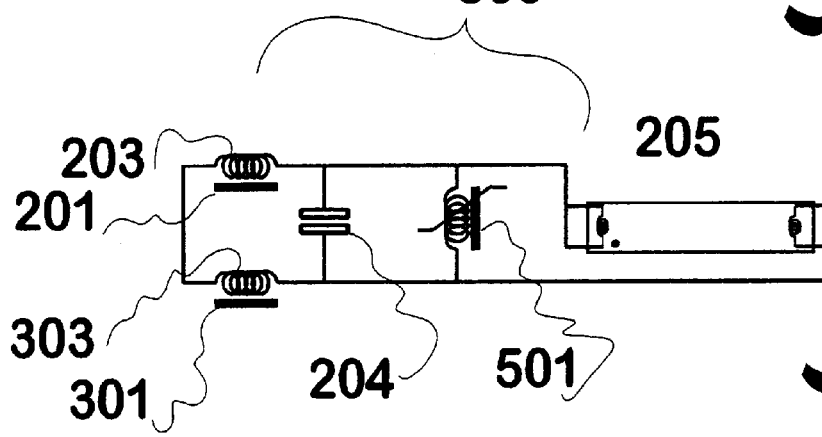

FIG. 5: is an illustration of a circuit including over-voltage protection suitable for use with the present invention.

Figure 6:
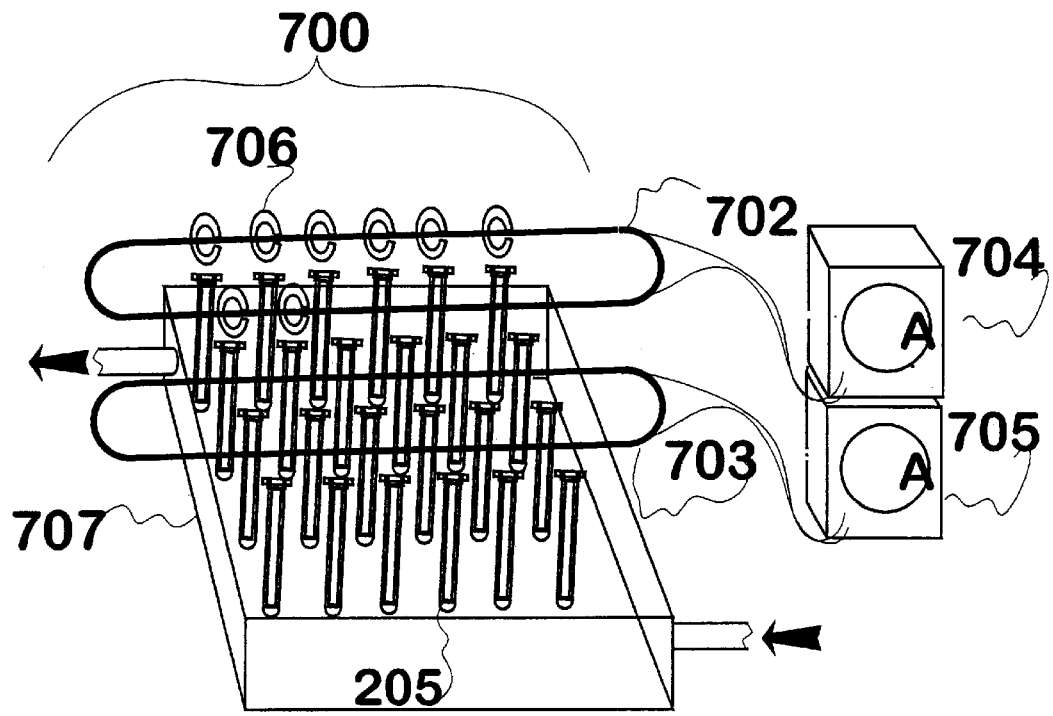

FIG. 6: is an illustration of a working circuit of the present invention—driving an array of water-sterilising lamps.

Figure 7:
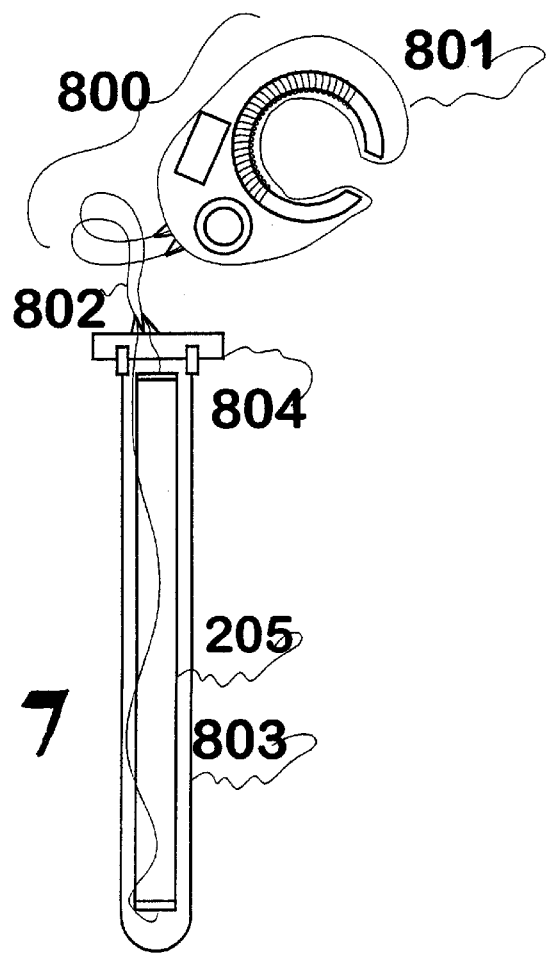

FIG. 7: is an illustration of a single light and power supply unit (as per FIGS. 2, 3, or 5) of the present invention, suitable for use in an ultra-violet irradiation array of water-sterilising lamps.

PREFERRED EMBODIMENT

PRINCIPLES

This invention relates to means to pick up current from a primary conductor carrying high-frequency, high-current electricity (such as 25 kHz, at 60 A) or optionally a multi-turn primary conductor having an equivalent amount of magnetic flux, and convert it into a form of power well suited to the characteristics of a gas-discharge lamp, which characteristics (see FIG. 1) are relatively difficult to satisfy.

The output of the invention powers a lamp with a current (proportional to a brightness) in proportion to the flux about the primary conductor, while the lamp current remains largely independent of the lamp's own "resistance" (assuming that the lamp is warm and that at least a minimum amount of power is supplied to it).

An example gas discharge lamp is a mercury vapour plus inert gas filled elongated glass tube of the type commonly referred to as a fluorescent lamp. This name refers to the use of one or more phosphors coating the inside of the glass tube, where they are excited by ultraviolet light to produce visible light of use in most applications. A fluorescent lamp is normally driven from the AC mains (110 V, 60 Hz, 240 V, 50 Hz etc) and used in combination with a ballast (to limit current; the lamp having a negative resistance when in its running mode) and starting gear, to heat the electrodes during startup and to provide a high-voltage starting pulse. It is difficult to provide brightness control for a fluorescent lamp.

FIG. 1 is a diagram 100 including the voltage-current characteristics 101 of a typical fluorescent lamp. At zero current (at the moment of ignition) the voltage across a lamp of this type may be abut 600 V. The "S" curve represents a zone of instability involving, we presume, various internal ionic current and emission processes. The main portion of the curve has a slope downwards towards the right, reflecting a negative resistance within the lamp.

FIG. 1 also illustrates (at the right side) the approximate Q (from 1 to 4) of a resonant circuit according to the invention at various output voltages.

In its simplest form 200 this invention (see FIG. 2) comprises an inductor capable of intercepting some of the flux surrounding the primary conductor or conductors. Conveniently this inductor has an opened ring or "C" shaped magnetically soft ferrimagnetic core 201 placed over the primary conductor or conductors 202 where it is capable of entraining flux radiated from the conductor. A number of turns of wire 203 are wrapped around the core; typically 100 turns, and the ends of the wire are connected to a resonating capacitor 204 for tuning the resonant circuit to about the frequency of the current in the primary conductor. Preferably the wire is a type of litz wire. An output is taken to each end of a fluorescent lamp 205 from across the capacitor and no attempt is made to provide for electrode heating. Nor is any attempt made to provide for other ignition devices or "starting gear" to strike an initial arc within the lamp.

Surprisingly, the circuit of FIG. 2 is well optimized to drive a single fluorescent lamp with high-frequency alternating current. Lamps run efficiently with higher frequency currents. It provides a high starting voltage and a lower voltage at virtually a constant current. The voltage developed by the excited inductor of the circuit can be described by the formula:

$$v = j\Omega M I n$$

where v=volts, represents the changing flux, M is the coupling constant between primary conductor and secondary, I is the primary current, and n is the number of turns in the excited inductor. Here, the inductor may be considered as a voltage source in series with an inductor, together in parallel with a capacitor, providing a resonant circuit. Converting this to the Norton equivalent provides a constant current source having an inductor and a capacitor in parallel. When in use at the resonant frequency cancels out at the resonant frequency and the current I flowing through the lamp can be described as:

$$I = \ln\frac{M}{L}$$

and I is ideally independent of the voltage across the lamp. FIG. 1 also shows a typical current/voltage output from this circuit at line 102, which is nearly vertical. A vertical line would correspond to an ideal current source. The intersection 103 of lines 101 and 102 shows the operating point for the lamp. The line 102 may shift from side to side if the input current or at least the flux to the circuit of the invention is varied. The example line 102 intersects the lamp line (which relates to an 80 W lamp) at 200 V, 380 mA. Therefore one can assume that the lamp may be driven at any point at least along its linear section (subject to its maximum ratings) thereby providing for dimming of the lamp. It has been found with an ordinary lamp that a ratio of 10:1 of stable illumination can be achieved once the lamp has been warmed up. Dimming is simply achieved by varying the current in the primary conductor. This ratio is at least as good as prior art fluorescent lamp dimmers, and it is possible that specially adapted types of lamp may exhibit improved behaviour.

By way of contrast with known resonant secondary pickup circuits, most of these (as long as the coupling coefficient M has a low value) also tend to exhibit a constant-current type of output; that is; their short circuit current is low. Where M has a high value, such as in the case of a conventional transformer, events occurring in the secondary are coupled back into the primary and the useful properties such as a constant-current output are not easily developed.

Not until development of the present circuit, particularly when used in combination with a discrete second inductor having a current-limiting purpose, (see "Current Control" below) has there been an attempt to control the short-circuit current itself. In previous circuits we have generally relied on regulation of a more-than-ample output rather than setting a current at the circuit itself. Generally we have used shorting of the resonant circuit for a number of cycles in order to control the output, after rectification and smoothing, of resonant secondary circuits.

Advantages of this approach include that the resonant circuit is simpler, the parts count is reduced and that the amount of secondary current can be provided by controlling the primary current. We may be able to incorporate the second inductor with the first inductor, thereby providing one cheaper device having the desired properties in combination, though it is likely that two cores will be used. Possibly a saturable core would suffice.

It appears that cold lamps (by which we mean lamps having a temperature of up to about 40 deg C.) are unstable at low currents, whereas once they have been run at full current for a short period (or otherwise pre-heated to normal operating temperatures of approximately 60–80 deg C. they can then be run at lower currents without instability—resulting in visible flickering. (These observations relate to one type of standard items that we have tested and it is likely that modifications to fluorescent lamps may or may already have overcome this cold-instability effect) We have not established whether it is the whole lamp or just the electrode region that is temperature-dependent.

STARTING CONDITIONS

A further surprising advantage of a resonant pickup device according to FIG. 2 is that the Q of the circuit, when unloaded, allows for the development of a high voltage. Typically, the Q of the circuit is 6 or more prior to loading by the lamp. Typically it drops to 2 when the lamp is in a conducting state (when the current limiting feature is in effect). When the Q is of the order of 6, the circuit develops a voltage of the order of 600 V, 25 kHz which is sufficient to ignite a fluorescent lamp. When the lamp is struck the voltage drops to about 200 V (when used with nominally 240 V AC lamps). This change in Q is shown in FIG. 1 as the scale at the right, in relation to the voltage of the circuit output line.

The advantages of a low operating Q include:

The tube can be re-struck without provision of other components if for some reason it is extinguished.

A number of circuits according to FIG. 2 (or developments of that circuit) and lamps may, if driven in combination from a single primary conductor, operate poorly if each pickup circuit has a high Q and hence show high resonating currents within their inductors which can generate a flux to inhibit the passage of primary current.

Relatively tight current control.

Relatively insensitive to tuning errors.

CURRENT CONTROL

Voltage is conveniently controlled for the present application as a function of the Q of the resonant circuit. It would be desirable to provide an independent control of current, so that the output of the secondary resonant circuit of FIG. 2 can be limited with reference to current as well. Therefore we make part of the inductor of the resonant circuit a separate inductor not involved with power pickup (i.e. substantially not including means to collect flux from a source of magnetic flux). This inductor is placed in series with the "C" inductor picking up the inductive power. The value of the current control inductor can be determined by the process of determining the current required to run the lamp and setting L1 (the pickup coil) to provide a correct strike voltage, while L2 sets an independent current imit.

Current required is set by:

$$I1 = \frac{M}{L1+L2}\ln\cdots$$

FIG. 3 illustrates the circuit 300 of FIG. 2 with the additional current control inductor 303 (core 301), and includes example parts values. The "C" inductor 203 (value 1 mH) is wound as 100 turns on a core 201 comprising a 50 mm diameter ferrite toroid having a gap of about 1 cm cut from its ring. The current controlling inductor 303 may be wound as 20 turns on a separate, gapped toroidal core. The capacitor 204 is about 33 nF, and is preferably a high-current type suitable for carrying the expected amount of resonant current. The circuit is used to drive an 80 watt fluorescent lamp 205.

DRIVING THE PRIMARY CONDUCTOR

Although a high-frequency generator or any other source of high-frequency AC (preferably in the range of from 400 Hz as in aircraft up to 1 MHz) may be used, one preferred means for energising the primary inductor is to use a resonant power supply of the type previously described in our U.S. Pat. No. 5,450,405 "Resonant Power Supplies", the contents of which are hereby incorporated by way of reference and illustrated in simplified form at 400 in FIG. 4. (Note that the ammeter 405 and the altered primary conductor arrangement 410 are modifications made for this invention).

This kind of supply is compact, efficient, and cheap. The power is provided to 202 which comprises a resonating primary inductor as well as a conductor distributing inductive power about a region. Hence the high-frequency power is substantially sinewave in nature and radiates only a small component of energy as harmonics. The capacitor 406 resonates with the inductance possessed by the primary inductor 202. A pair of solid-state switches driven in a complementary manner by a controller 409 alternately ground each side of the capacitor while DC power passes through large-value inductor 407, then through a line 402 to a series limiting inductor 404 to the source of power. Current supplied to the lamps 205 may be accurately measured by an ammeter 405. Illumination from the lamps may be controlled by varying the "ON" time of the solid-state switches, or by using a variable DC voltage to supply the resonant circuit.

As will be discussed later, if the number of lamps driven by a single supply is a small integer L (up to say 10 to 12, depending on the quality of the ammeter) it is possible to detect the failure of n lamps as a reduction in current by n/L. There is of course a fixed "baseline" current perhaps reflecting losses within the power supply and wasted magnetic flux radiated from the primary conductor.

In a trial of a FIG. 3 circuit, a laboratory power supply was producing 200 V, 1.13 A (226 W) to a resonant power generator in order to drive a single tube at 173 V, 400 mA (69.2 W). When the tube was shorted out, thereby eliminating its load on the resonant primary conductor, the power supply was found to provide 200 V, 0.76 A (152 W).

The marginal efficiency of this example is of the order of 69.2/(226–152) or 94%.

In order to economise on solid-state switch devices, which are much cheaper when provided at lower current ratings, the circulating current (for example 15A) in the primary conductor may be boosted by using several looped turns of primary inductor as shown in the insert, at 410, so that for example four turns 202 included within any one "C" pickup inductor 201 produces as much flux as that from a one-turn 60 A primary.

For a resonant power generator according to FIG. 4, the primary inductive loop has an "ideal length" or at least a preferred inductance, in order to resonate with the capacitor of the power supply at a nominal frequency. If for some reason it is not practical to provide that length, lumped inductances may be inserted in order to make up the voltage. For any type of primary loop driver, the primary loop 202 may be run over relatively long lengths as a twisted pair or the like, carrying opposing currents, so comprising a low-inductance or even a zero-inductance carrier of power, and is spread apart only at intended pickup points.

FAULT CONDITIONS

One problem was that should the load on a circuit be absent, (as when the lamp is open-circuit) high voltages remain and the Q remains high. Therefore we propose that a saturating inductor be placed across the output of the circuit, as shown at 501 in FIG. 5. It may be possible to develop the "C" pickup core itself as a saturating inductor, in order to minimise the parts count. The saturating inductor becomes saturated at a certain voltage and thereupon changes the circuit resonant frequency so that coupling to the primary inductive loop is adversely affected, and the amount of circulating current in the pickup circuit is limited.

PRODUCTION

The simplicity of this circuit lends itself to manufacture as a single, sealed unit or even as a disposable device to be sold together with a lamp. These are as shown at 800 in FIG. 7, where 801 is a potted inductor/resonant capacitor/pickup coil, wired (802) to a tube (205) shown here for the purposes of one example application in a watertight ultra-violet transmitting case 803. A cap 804 may allow separate tube replacement, or cleaning.

APPLICATION 1

Using fluorescent lamps or the like in damp environments, particularly where humans are likely to receive shocks.

Typical environments are marine (such as on boats or wharves) where sea water conducts well, in food or meat processing plants, signage used outdoors, or in sterilisation units at sewage treatment plants.

This application of the invention is represented by FIG. 4, where a number of isolated lamp power supplies like 411 power lamps like 205 from a single turn (202 or multi-turn (410) primary inductor. This application has a number of advantages, including:

1. Safety: each lamp is powered by an isolated supply; that is, there is no connection to ground, and each isolated supply may be turned off as for servicing by simply lifting it off the primary inductor. Indeed, the entire assembly may be operated when submerged. Where each lamp has to be ignited or struck this circuit is preferably used on a 1:1 basis; one circuit per lamp. Alternatively lamps could be run in series from one higher-voltage circuit.
2. Efficient operation.
3. Failed tube detection by current measurement at the power supply, as described above.
4. Alternative failed tube detection by current indicator (such as a light-emitting diode indicator in a current-steering bridge in series with the lamp.
5. Alternative failed tube detection by UV light sensing means; either a UV sensitive diode by each lamp, arranged in a X-Y matrix and read out in an X-Y manner, or photoconductive plastics material, or an optionally fluorescent-tipped optical fibre placed by each lamp.
6. Illumination control; a bank of new tubes can be run at a reduced power, if there is normally a safety margin to allow for tube output decline through life. This will further reduce tube decline.
7. Simplicity of lamp energising means.

A similar arrangement may be useful in sterilising milk, as an alternative to pasteurisation, wherein destruction of the nucleic acids of micro-organisms (by the ca. 200 nm wavelengths of mercury) without alteration of the proteins and other components of milk is sought.

A similar arrangement may also be useful in sterilising air in air conditioning plants, although means to minimise ozone production will presumably be required.

APPLICATION 2

This example uses the invention as a combination of powering and dimming means for conventional fluorescent lamps used for lighting rooms or spaces used by humans. Two example applications for dimming fluorescent lamps are (a) in lecture theatres, and (b) in work spaces such as offices in "intelligent buildings" where any work space is lit by closed-loop control according to a measured combination of ambient and artificial light. In the design of intelligent buildings one underlying concept is economy; superfluous lighting costs energy directly and also in that extra heat must be extracted. In the case of a lecture theatre and assuming that all types of fluorescent lamp are subject to instability when cold, it may be necessary to heat the lamps with an alternative means, as long as the lecture theatre is in use, to provide for the possibility that they may be used in a dim mode, starting from "off". Heating means may be: hot air, local heating wire or tape, permanently energised tube filaments, or the like. Of course it may be possible to develop a tube better optimised to run in a dim mode, starting from "off" when cold. It may include a separate starting electrode, or electrodes optimised for high-frequency use, and may exploit corona discharge from pointed conductors.

A circuit as indicated in FIG. 4 would generally be used to supply the primary conductor, along with power control means applied to the power supply; either by a capability to vary the DC feed voltage from the rectifier 403, or by varying the on/off ratios of the complementary switch controller 409. Each power supply then controls a number of lamps together.

In this Example, the enhanced ratio of bright to dim (up to 10:1) is very useful in lecture theatres or the like.

A related advantage is that by eliminating starters and ballast chokes the installation is less costly, and will be more reliable, hence needing less maintenance. Radio interference from the installation is minimal because the primary inductors carry substantially a sine wave and the waveform in the secondary side is a partially flattened sine wave.

Furthermore, 100 Hz lamp flicker, annoyingly perceptible to younger people at least in their peripheral vision, is eliminated.

APPLICATION 3

Use as an isolated supply for outdoors fluorescent lamps, as might be used in signs. Here the advantage is that the supply is isolated and any lamp or lamp power supply within the installation is less prone to damage as a result of water ingress (electrolytically promoted corrosion) and the installation when wetted is less dangerous to servicemen or to the public because the lamps are isolated. Marine or seaside environments are prone to salt spray, which when wet is quite conductive.

APPLICATION 4

Use in supplying controlled power to neon signs. Starting these lamps in 50 Hz conditions is particularly difficult because of the high ignition voltages (up to 15 kV) required to strike a discharge between widely separated electrodes. Once started, these lamps run at a relatively low voltage and also exhibit a negative resistance, and so are compatible with the circuit of the invention. The windings on the "C" inductor would in one option be greater in number to reach a higher voltage. In this version, the resonating capacitor has a voltage rating capable of withstanding high voltages. Alternatively a high-frequency transformer, which will be a great deal more compact than the 15 kV, 30 mA conventional transformer for 50 Hz use, could be used to step up the initially low resonating voltage.
(Alternatively a separate start circuit may be made with a low-current voltage multiplier, as is used for example in helium-neon laser power supplies).

Advantages include:
Greater safety because the secondary circuit is totally isolated from ground, extending to some immunity to water or condensation.
Capacity to control the brightness of the neon sign by controlling the current in the primary conductor. (We are not aware of neon signs showing controllable brightness; we are aware of only on/off control).

Brightness control adds a novel dimension to the scope and planning of neon-based advertising displays, and extends the life of the electrodes of a given dim/bright flashing type of sign over one in which repeated starting is made to occur.

A preliminary test was made with a sample "neon" tube filled with argon, the example producing a greenish-blue light through a blue glass tube about 1.5 meters long. Windings on the "C" inductor designed to reach a higher voltage of about 1 kV to start the tube, and about 400 V when the tube operates, comprise between 500 and 1000 turns of copper on a segmented bobbin. We found that the tube was easily controllable—i.e. dimmable—when it was hot, but if it was cold reduction of the primary current tended to result in the tube going out. It appears that these tubes may need to be run within a heated transparent enclosure to permit dimming strategies having no regard for hotness of tube, or alternatively dimming strategies should be designed to have a "hidden agenda" to heat the tube and maintain hotness, while also attracting attention.

Advantages of this way of driving a neon sign include dimmability and simplicity. The ability to conveniently dim a neon sign is previously unknown. In relation to simplicity, current practice appears to be to drive each separate neon tube with its own high-voltage transformer, each transformer having switching means in its primary winding. Our driving system (FIG. 4) having just one controllable power supply and a primary conductor supplying pickup circuits; one for each of a number of tubes, would be cheaper and safer.

In relation to encasing a dimmable tube in a transparent box; this is provided in any case in order to maintain safety and to protect the tube itself; often the product of a glass blower's art.

APPLICATION 5

Driving conventional incandescent (filament) lamps can be a problem in certain situations, such as in hazardous areas like coal mines where sparks are likely to set off explosions or water is likely to cause shocks to miners. Here the negative resistance that is characteristic of a hot metallic filament is suited to this type of energising circuit While the pickup circuits would inherently retain the higher "strike" output voltage discussed above, this is not relevant to a filament lamp. Incandescent lamps could be driven within swimming pools, their surrounds, or the like.

APPLICATION 6

In sewage treatment (for example) it is known to sterilise water by irradiating it with ultraviolet light produced from mercury vapour type fluorescent lamps modified by (a) an absence of phosphors, and (b) a transparent quartz envelope instead of the usual glass, to transmit the ultraviolet emissions of excited mercury atoms. Generally the lamps are provided as a bank of lamps each within a quartz test-tube shaped container, and generally there is means to maintain the amount of UV light, such as means to detect faulty lamps and means to detect the total amount of UV light. Generally the tubes holding the lamps are immersed in a flow of fluid to be sterilised. A bank of lamps in quartz tubes is generally used, in an X-Y matrix.

We propose to apply the present invention to this application, and accordingly each lamp plus power supply is like the unit of FIG. 7, and one or more primary conductors crosses over the power supply end of the bank of lamps, so that each "C" inductor clips over the conductor. Conductors may be provided with a number of "C" inductor locating means, such as clips, perhaps like clothes pegs, or indentations within the external sheath of the conductor, or an embedded ferrite permanent magnet that attracts the soft ferrite of the toroid.

If the type of lamp failure sensor to be used is power supply current drawn, then preferably only 10 or 12 or so lamps are driven from a single power supply which is then rated at about 800 W to 1 kW.

This application of the invention has a number of advantages, including:

1. Safety: each lamp is powered by an isolated supply; that is, there is no connection to ground, and each isolated supply may be turned off as for servicing by simply lifting it off the primary inductor. Indeed, the entire assembly may be operated when submerged. Where each lamp has to be ignited or struck this circuit is preferably used on a 1:1 basis; one circuit per lamp. Alternatively lamps could be run in series from one higher-voltage circuit.
2. Efficient operation.
3. Failed tube detection by current measurement at the power supply, as described above.
4. Alternative failed tube detection by current indicator (such as a light-emitting diode indicator in a current-steering bridge in series with the lamp.
5. Alternative failed tube detection by UV light sensing means; either a UV sensitive diode by each lamp, arranged in an X-Y matrix and read out in an X-Y manner, or photoconductive plastics material, or an optionally fluorescent-tipped optical fibre placed by each lamp.
6. Illumination control; a bank of new tubes can be run at a reduced power, if there is normally a safety margin to allow for tube output decline through life. This will further reduce tube decline.
7. Simplicity of lamp energising means.

A similar arrangement may be useful in sterilising milk, as an alternative to pasteurisation, wherein destruction of the nucleic acids of micro-organisms (by the ca. 200 nm wavelengths of mercury) without alteration of the proteins and other components of milk is sought.

A similar arrangement may also be useful in sterilising air in air conditioning plants, although means to minimise ozone production will presumably be required. In FIG. 6, an example lamp system is shown, driving a number of fluorescent tube/secondary pickup units (as per FIG. 7) by primary inductive pathways 702, 703 from a pair of resonant primary power supplies 704, 705. These supplies carry ammeters (see below). This system is intended for the bulk irradiation of a tank of liquid 707 which might be sewage in the later stages of purification, when removal of pathogens is desirable. A number of lamp units are hung from primary inductive lines so that the emitting portions dangle in the liquid. (706 indicates one of a number of pickup coil cores).

FIG. 7 shows the physical manifestation of a pickup coil assembly (800), conditioning means, and a lamp 205 inside a tube 803, sealed with a cap 804. The coil assembly picks up power from a "C"-shaped coil (see 203 —FIG. 2) and controls the amount of circulating secondary resonant current as previously described, and passes power to the lamp down a pair of wires 802 to the lamp itself 205. Advantages of this application of inductive power transfer include that the lamp supply is electrically floating and it is inherently difficult to form a shock hazard from such a configuration.

One advantage of this type of arrangement is that it is possible to remotely detect the failure of n lamps as a reduction in current by n/L. There is of course a fixed "baseline" current perhaps reflecting losses within the power supply and wasted magnetic flux radiated from the primary conductor. If the number of lamps driven by a single supply is a small integer L (up to say 10 to 12, depending on the quality of the ammeter), it will be possible to see a unit drop in current if one lamp fails.

In a trial of a FIG. 3 circuit, a laboratory power supply was producing 200 V, 1.13 A (226 W) to a resonant power generator in order to drive a single tube at 173V, 400 mA (69.2 W). When the tube was shorted out, thereby eliminating its load on the resonant primary conductor, the power supply was found to provide 200 V, 0.76 A (152 W).

Finally, it will be appreciated that various alterations and modifications may be made to the foregoing without departing from the scope of this invention as set forth.

What is claimed is:

1. A circuit for collecting inductively transferred electric power and supplying the power to a load having a negative resistance, the circuit comprising:
   (a) at least one first inductor having a core oriented so that it is capable of intercepting, in a loosely coupled fashion, the magnetic flux radiating from a powered primary conductor, thereby causing a voltage to be induced in the windings of the at least one first inductor,
   (b) at least one second inductor in series with the at least one first inductor, the second inductor having a core substantially incapable of intercepting the magnetic flux radiating from the primary conductor,
   (c) at least one capacitor connected in parallel across at least one of the series of inductors, thereby forming in combination with the series of inductors a circuit capable of resonance at or about a supply frequency,
   (d) an output from across the at least one capacitor,
   (e) the second inductor being saturated by the current therethrough at a predetermined value of said current and thereby detuning the resonant circuit, so that in use the circuit provides
   i) when not under load, an alternating output at a high voltage—and then
   ii) when under load, a source of the constant-current type, supplying a current substantially proportional to the magnetic flux about the primary conductor yet substantially independent of the resistance of the load, and having an upper current level limited by the second inductor.

2. A circuit as claimed in claim 1 connected to the load, wherein the load is a gas discharge lamp, the lamp having a relatively high striking voltage, and a negative resistance within an arc therein, when struck.

3. A circuit as claimed in claim 2, including power pickup means comprising said first inductor for receiving a magnetic flux from an elongated primary conductor and said capacitor connected in parallel across the inductors to be capable of resonating at a predetermined frequency, wherein in use the loading of the circuit by the lamp has the effect of lowering the Q of the circuit from at least 5 in a non-loaded state down to about 2, so lowering the voltage produced across the lamp.

4. A circuit as claimed in claim 3 including load monitoring means for monitoring the load drawn from the elongated primary conductor, the means comprising an ammeter connected to said power supply.

5. A circuit as claimed in claim 3, suitable for generating light underwater wherein the circuit comprising at least one of said capicitors in parallel with at least one of the inductors is encapsulated within a waterproof casing and has no bare connectors.

6. A circuit as claimed in claim 1 wherein the supply frequency lies between 400 Hz and 1 MHz.

\* \* \* \* \*